July 17, 1923.
J. ZAJIC
COUPLING
Filed Feb. 3, 1922
1,462,406
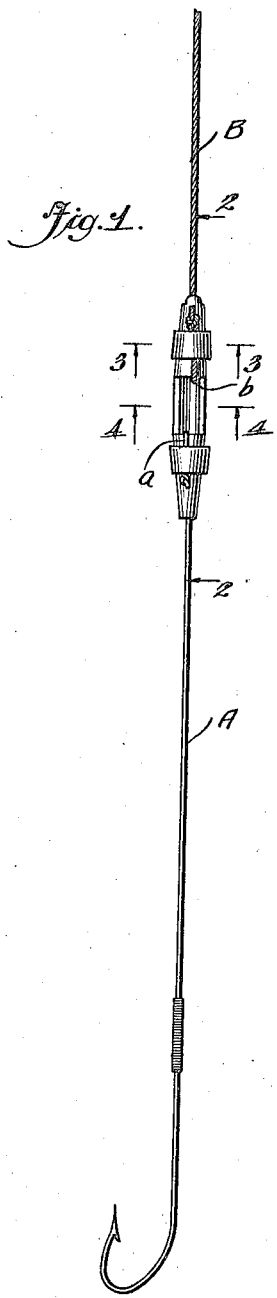
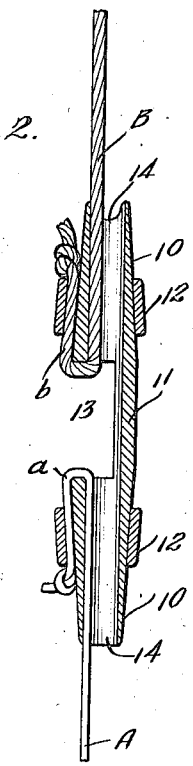
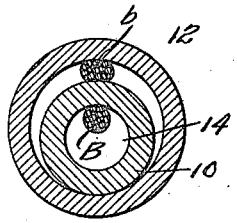
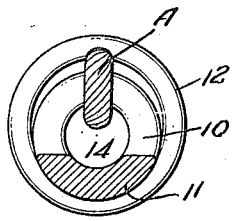
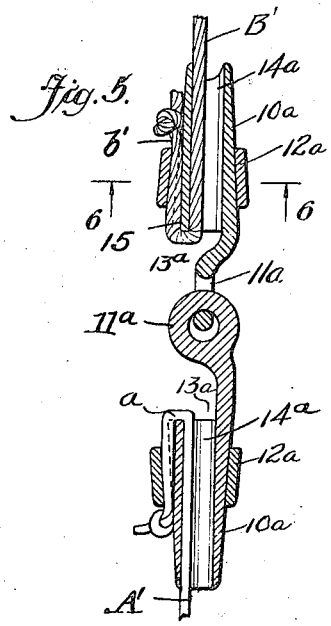
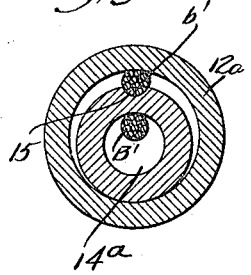
INVENTOR
JOSEPH ZAJIC Patented July 17, 1923.

1,462,406

UNITED STATES PATENT OFFICE.

JOSEPH ZAJIC, OF JERSEY CITY, NEW JERSEY.

COUPLING.

Application filed February 3, 1922. Serial No. 533,892.

*To all whom it may concern:*

Be it known that I, JOSEPH ZAJIC, a citizen of the United States, and a resident of Jersey City, in the county of Hudson and State of New Jersey, have invented a new and Improved Coupling, of which the following is a description.

My invention relates to a coupling and more particularly is intended for connecting the ends of a cord, rope, or cable, for attaching a snell to a fish line or the like.

The general object of the invention is to provide a coupling for the indicated purpose of very simple form and improved in various particulars with a view to promote convenience in applying the coupling and to effect a secure connection between the coupled elements.

The nature of the invention and its distinctive features and advantages will clearly appear as the description proceeds.

Reference is to be had to the accompanying drawings forming a part of this specification, it being understood that the drawings are merely illustrative of practical examples of the invention.

Figure 1 is an elevation of a coupling embodying my invention, showing the same applied to secure a snell to a fish line;

Figure 2 is an enlarged longitudinal vertical section of the coupling at the adjacent ends of the connected elements;

Figures 3 and 4 are cross sections respectively on the lines 3—3 and 4—4 of Figure 1;

Figure 5 is a view similar to Figure 2 but illustrating the coupling having a form to run through a sheave or pulley;

Figure 6 is a cross section on the line 6—6, Figure 5.

Referring at first more particularly to Figures 1 to 4, the coupling is formed with reversely tapered ends, the bases of the ends being disposed toward the transverse center of the device. The ends 10 in the form shown in Figures 1 to 4 are integral with the connecting central web 11. On each end fits a tapered clamp ring 12. The ends 10 are separated at their bases to present at one side of the web 11 a clearance space 13 for the convenient manipulation of the elements to be coupled such, for example, as a snell A and a fish line B. The ends 10 are tubular to present axial bores 14 which advantageously aline with each other.

With the described construction the elements A, B are respectively passed into the bores 14 from the outer ends thereof and through the clearance space 13, whereupon the ends of the elements A, B are return bent as at $a$, $b$ to lie along the tapered external surfaces of the ends 10. In securing an end of an element A or B the ring 12 may be moved to the smaller terminal of an end 10 or moved onto the element A or B after the latter has been passed through the bore 14 of said end 10. The element A or B having been return bent to lie against the tapered external surface, the ring 12 is passed over the said returned end until it effects a tight clamping action. It will be seen that any pull exerted on an element A or B secured to the coupling device will tend to draw the clamping ring more tightly on the tapered end 10.

In the form shown in Figure 5 each end $10^a$ is substantially the same as in the first described construction, being tapered externally and having an axial bore $14^a$ and a clamp ring $12^a$ corresponding with the ring 12. In this form of the invention, however, instead of a rigid web or body 11 integral with the clamping ends, the ends $10^a$ are formed with eyes $11^a$ at right angles to each other and interengaged to lend flexibility to the coupling so that for coupling the ends of a clothes line, for example, or other rope or cable, the device will be readily passed through a sheave or pulley. The elements A', B' in Figure 5 may be considered a clothes line. When made for taking a rope or cable of substantial thickness, either the end $10^a$ or the clamp ring $12^a$ will have a longitudinal groove 15 to partially accommodate the returned end $b'$ of the element to be secured. The ends $10^a$ are maintained separated by the eyes $11^a$ to present an ample clearance space $13^a$ at the inner end of each end $10^a$.

I would state in conclusion that while the illustrated examples constitute practical embodiments of my invention, I do not limit myself strictly to the exact details herein illustrated, since, manifestly the same can be considerably varied without departure from the spirit of the invention as defined in the appended claims.

Having thus described my invention, I claim:

1. A coupling of the class described including tapered coupling ends, means connecting the ends with each other and clamp rings on said ends, the said ends being tapered externally and the clamp rings having a corresponding taper and said ends having axial bores for the passage of elements to be coupled from the outer ends through the said bores to the inner ends, the opposed bases of said ends being separated to present a clearance space permitting of the elements to be coupled being return bent on to the tapered exterior of said ends to extend through the clamping ring.

2. The combination with two flexible elements to be coupled, of a coupling device presenting connected tubular ends tapered externally, and tapered clamping rings on said ends, the said coupling ends being separated to present a clearance space therebetween and said flexible elements extending through said ends to the clearance space and return bent onto the tapered exterior of said ends and extending through the said clamping rings.

3. The combination with two flexible elements to be coupled, of a coupling device presenting connected tubular ends tapered externally, and tapered clamping rings on said ends, the said coupling ends being separated to present a clearance space therebetween and said flexible elements extending through said ends to the clearance space and return bent onto the tapered exterior of said ends and extending through the said clamping rings, there being longitudinal grooves to partially accommodate said returned ends of the flexible elements.

JOSEPH ZAJIC.